United States Patent
Blawat et al.

(10) Patent No.: US 6,198,878 B1
(45) Date of Patent: Mar. 6, 2001

(54) METHOD AND APPARATUS FOR ENCODING AND DECODING DIGITAL VIDEO DATA

(75) Inventors: Meinolf Blawat; Carsten Herpel, both of Hannover (DE)

(73) Assignee: Deutsche Thomson-Brandt GmbH, Villingen-Schewenninghen (DE)

( * ) Notice: Subject to any disclaimer, the term of this patent is extended or adjusted under 35 U.S.C. 154(b) by 0 days.

(21) Appl. No.: 09/125,408

(22) PCT Filed: Feb. 22, 1997

(86) PCT No.: PCT/EP97/00863

§ 371 Date: Aug. 18, 1998

§ 102(e) Date: Aug. 18, 1998

(87) PCT Pub. No.: WO97/32436

PCT Pub. Date: Sep. 4, 1997

(30) Foreign Application Priority Data

Mar. 2, 1996 (EP) .................................................. 96103269

(51) Int. Cl.[7] .................................................. H04N 5/92
(52) U.S. Cl. ............................ 386/111; 386/112; 386/126
(58) Field of Search .......................... 386/46, 109, 111, 386/112, 124, 125, 126; H04N 5/92

(56) References Cited

U.S. PATENT DOCUMENTS 5,134,476   7/1992  Aravind et al. ....................... 358/133
5,844,867 * 12/1998  De Haan et al. ...................... 386/109
6,064,795 *  5/2000  Uchide ................................ 386/112

FOREIGN PATENT DOCUMENTS 595 268   5/1994  (EP) .
637 891   2/1995  (EP) .
664 651   7/1995  (EP) .
670 663   9/1995  (EP) .

* cited by examiner

Primary Examiner—Huy Nguyen
(74) Attorney, Agent, or Firm—Joseph S. Tripoli; Eric. P. Herrman

(57) ABSTRACT

The bit rate control goals for applications using storage devices with the capability to process a variable bit rate data stream differ from the constant bit rate case. Therefore the encoder control strategy is adapted to this situation. For the first e.g. 80% of the total playing time an average bit rate is produced which is e.g. 95% only of the normal average bit rate. For the remaining 20% of the playing time the value for the desired average bit rate ascends to e.g. 150% of the normal value. During the first 80% the virtual buffer size is increased by a factor of e.g. 100 whereas during the last 20% the virtual buffer size descends to the normal value. Thereby an increased decoding quality can be achieved during e.g. 80% of the playing time. In the remaining playing time there is nearly no loss in the normal decoding quality.

11 Claims, 2 Drawing Sheets

METHOD AND APPARATUS FOR ENCODING AND DECODING DIGITAL VIDEO DATA

FIELD OF THE INVENTION

The present invention relates to a method and to an apparatus for encoding and decoding digital video data for and from, respectively, storage media having a given data storage capacity.

BACKGROUND OF THE INVENTION

ISO/IEC 13818 "Information Technology—Generic coding of moving pictures and associated audio information: Video" (MPEG2) discloses an International standard concerning coded digital video and audio data streams. Due to varying picture content the generated amount of code varies over time. However, in case of fixed channel capacity normally a constant bit rate (CBR) MPEG encoder control is desired which can be achieved by using an encoder buffer at transmission side and a decoder buffer at receiver side which is explained in more detail in annexes C and D.4 of said International standard. The other mode is variable bit rate (VBR) coding.

SUMMARY OF THE INVENTION

If there is any digital storage medium like DVD (digital video disc) which is capable of variable bit rate operation it might be possible to improve the coding quality by using variable bit rate coding instead of constant bit rate coding.

It is one object of the invention to disclose a method of variable bit rate encoding for a fixed-capacity storage medium in which the coding quality is basically improved compared to that of constant bit rate encoding.

It is a further object of the invention to disclose a method of variable bit rate decoding from a fixed-capacity storage medium in which the decoding quality is basically improved compared to that of constant bit rate decoding.

It is a further object of the invention to disclose an encoding and a decoding apparatus which utilises the inventive encoding and decoding method, respectively.

It is a further object of the invention to disclose a digital video signal which is encoded or decoded according to the inventive method.

"Constant bit rate" shall mean a constant number of bits output to the channel (or e.g. the Systems multiplexer) in each field period (2 0ms in a 50 Hz TV signal), while "variable bit rate" shall cover all other bit delivery schedules. In a CBR environment the kernel MPEG encoder circuit is followed by a buffer of a certain size. This buffer is used to smooth the inherently variable bit rate output of the kernel MPEG encoder. The video buffering verifier VBV is a concept used in encoder control that gives an upper bound for the usable encoder buffer size as well as the minimum buffer size needed by a decoder to decode all bit streams compliant to this profiles @ levels (P@L). For all defined profiles @ levels maximum VBV_buffer_size values are specified in clause 8 of ISO/IEC 13818-2. Smaller values are also allowed and can be signalled in each bitstream by the VBV_buffer_size element. In a variable bit rate application there is no urgent need to use the encoder buffer to smooth the bit rate, however, it might still be useful to retain the buffer, as will become evident below. So the change is that the channel bit rate is variable now.

In both, CBR and VBR applications, the MPEG encoder and the MPEG decoder operate by using the well-known hybrid DPCM/DCT structures.

The bit rate control goals for applications using storage devices with the capability to process a variable bit rate data stream differ from the CBR case. It can now be desirable to:
maintain uniform quality over time;
maximise storage time on a medium of a given capacity.
Therefore the encoder control strategy needs to be adapted to this situation.

To ease understanding the encoder control for the CBR case shall be reviewed first.

The conventional encoder control strategy consists of three steps or control levels:
1) bit allocation (global control):

The allocation of bits to the different coded frame types (I, P, B frames) is determined according to their relative complexity $X_i$, $X_p$, $X_b$. The goal is to equalise the subjective quality of the frame types. In the following feedback implementation, which does not carry out any pre-analysis, it is assumed that video scenes are sufficiently stationary for some time, so that information from the past frames can be used for the bit allocation to the coming frame or field, depending on the coding structure. In the remainder of the specification, "frame" may generally denote a frame or a field or any other section of a GOP which is greater than a unit (to be defined below).

The complexity can be estimated by any criterion reflecting the relative coding cost for I, P, and B frames at a given image quality. However, it should be considered whether the necessary measurements can be obtained without too much burden on the encoder complexity.

First the "image quality" should be measured. However, it is well known that no commonly agreed, sufficiently simple, objective measure exists. Therefore, usually the signal-to-noise ratio (SNR) of the reconstructed frame is taken as an approximation to image quality. In the context of an MPEG encoder control even this measure is somewhat costly as it involves computation of SNR for each encoded frame. Therefore the average quantiser step size ($Q_i$, $Q_p$, $Q_b$) used to code a frame is taken as a quality indicator instead.

Now, having defined a measure for "quality", the "complexity" of a frame can be expressed as the product of bits generated and the quantiser step size used. In other words: a frame is complex to code if it produces many bits even if the quantiser step size is coarse. This product is formed for each unit m (e.g. macroblock or block or slice or any section which is smaller than a frame) and then summed over the frame:

$$x_m = b_m * q_m \tag{1a}$$

$$X_c = \mathrm{E} x_m, \tag{1b}$$

wherein $b_m$ is the number of bits for coding unit m, $q_m$ is the average quantiser step size used in unit m, and c=i, p or b is the coding type.

At the beginning of each Group Of Pictures GOP the bit budget $B_G(g)$ available for the current GOP g, considering also a carry $B_G(g-1)$ from the previous GOP, is $$B_F(n32\ 0) = B_G(g) = \text{(bit rate)} * \text{(frames per GOP)/(frame rate)} - B_G(g-1) \tag{2}$$

For each frame n in the current GOP, a target number of bits $T_c$, depending on its coding type c, is determined according to the computed complexity and the remaining number of frames of each coding type ($N_i$, $N_p$, $N_b$) within the current GOP.

Considering the remaining bits $B_F(n)$ after coding frame n-1 of the GOP, the following formula can be used:

$$T_c = B_F(n) * (X_c * K_c)/(N_i * X_i * K_i + N_p * X_p * K_p + N_b * X_b * K_b) \quad (3)$$

The factors $K_c$ are used to reflect different visual importance of frame coding types, typically $K_i = K_p = 1$ and $K_b < 1$.

The complexity computation according to equations (1a) and (1b) is normally updated after each frame, using data from the most recent I, P and B frames, to ensure a reasonable response to scene changes. The bit budget $$B_F(n+1) = B_F(n) - Eb_m \quad (4)$$

for the remaining frames of the GOP, after subtracting the number of bits $Eb_m$ used for the current frame, is re-distributed using formula (3) with $N_i$, $N_p$, $N_b$ set to the remaining number of frames of each type.

After coding the last frame N of the GOP, the remaining bits $B_G(g) = B_F(N)$ are carried to the next GOP g+1.

It is also possible to explicitly allow a non-constant amount of bits per GOP, keeping only the long-time average bit rate constant. Practically this can be implemented by re-filling the bit budget $B_F(n)$ after each frame using $$B_F(n) = B_F(n-1) - Eb_m + (\text{bit rate})/(\text{frame rate}) \quad (5)$$

instead of re-filling the budget only at the start of a GOP using equation (2). This budget will then always be distributed according to the number of I, P and B frames in a GOP, rather than only on the remaining frames in the current GOP. The effect of this change in case of a scene change in the middle of a GOP is that a scene change P frame might obtain more bits which improves its quality. However, due to VBV fullness and/or the reduced bit budget, most probably the next regular I frame will not get as many bits as it should, hereby decreasing the quality of the whole next GOP. Therefore, preferably, the "constant bit budget per GOP" notion is used for CBR applications.

A minimum bit budget is needed for each frame to be able to encode at least the overhead information. This is most important for B frames that tend to be least complex, therefore getting allocated very few bits. CBR rate control may use fixed minimum bit budgets, however, an estimation of the necessary overhead bit budget could also be made based on the past frames.

The maximum number of bits that can be allocated to a frame (usually an I frame) is bound by the status of the VBV. No more than VBV_buffer_size bits can be consumed by a single frame, given an initially empty encoder buffer.

2) buffer control (local control):

For each individual frame the bit production is controlled to be within some range of the allocated target number of bits, using a virtual buffer concept, that corresponds to a P-controller in control theory. This is depicted in FIG. 5. The virtual buffer $VBU_c$ is filled from the difference $e_m$ between the bits $b_m$ generated by each unit (macroblock) in the MPEG2 encoder MEN, and from the portion of the target for this unit, $t_m = T_c/M$, where M is the number of units per frame. Independent virtual buffers $VBU_c$ with a possibly different size $V_{co}$ are used for each frame coding type c=i, p, b, since difficulties in matching the target for one frame type should not propagate to other frame types. The status $d_m$ of the virtual buffer $VBU_c$ at the end of a frame is propagated as $d_o$ to the next frame of the same coding type:

$$d_m = d_o + E(b_m - t_m) \quad (6)$$

For each unit m a quantiser step size $q_m$ is computed in calculating means QC from the fullness of this virtual buffer $d_m$ relative to its size $V_{co}$.

The so-called "non-linear quantiser" table, see table 7-6 in ISO/IEC 13818-2, (which does not refer to non-linear quantisation) is used to obtain a sufficiently progressive non-linear mapping of the available 31 codewords for quantiser_scale_code to actual quantiser step sizes $q_m$. quantiser_scale_code can be simply set to $32 * d_m/V_{co}$. The very coarse quantisation available with this table can be used to deal with "panic" situations when the buffer is close to full. The size of the virtual buffer, $V_{co}$, which in control theory is called "reaction" parameter of the P-controller, determines the tightness of control. It can be made very large (even larger than the VBV) if it is acceptable that the number of bits generated deviates much from the target.

A large virtual buffer can be used, e.g., for P frames, since it is not known a priori whether a scene change will occur in the current GOP. In case of scene change the bit production can be unpredictably high. However, this will result in impaired quality only in such cases where the virtual buffer is filled to such extend that the quantiser step size is drastically increased.

Advantageously, the reaction to an unpredicted high bit production is delayed as much as possible, while an unpredicted low bit production should result in immediate reduction of the quantiser step size. This can be realised by different reaction parameters $V_{co}$, $Vd_{co}$, (i.e. virtual buffer size), which e.g. depend on the relation between the virtual buffer fullness $d_m$ when coding unit m and the initial fullness $d_o$ at the start of a frame, using:

if $d_m > d_o$ quantiser_scale_code=$32 * d_m/V_{co}$, else $$\text{quantiser\_scale\_code} = 32 * (d_o V_{co} - (d_o - d_n))/V d_{co}). \quad (7)$$

$Vd_{co}$, which is the reaction when $d_m$ is going down, should be small compared to $V_{co}$. $q_m$ is derived again by a look-up in table 7-6 of ISO/IEC 13818-2.

The status of the VBV should be monitored in addition to the control based on the virtual buffers, especially if control is "loose", i.e. the virtual buffers are big. While the target for a frame as well as the target for a whole GOP may be exceeded, the VBV, representing the decoder physical buffer, may never under- or overflow.

Furthermore MPEG disallows frequent occurrence of units (macroblocks) that exceed a certain number of bits (ISO/IEC 13818-2, table 8-6). This has to be monitored and controlled as well.

3) content adaptive quantisation:

To reflect the varying local complexity of different parts of an image, a local complexity measure for each unit can be computed. Currently this is derived from the AC energy of the luminance blocks of the unit.

The complexity factor obtained is used to modify the previously computed quantiser step size to some extend, e.g. by a factor in the range 0.5 to 2.0. Only this final quantiser step size information (coded as quantiser_scale_code) is transmitted in the bitstream each time it is different from that for the previous unit (macroblock). The aim is to distribute bits in such a way that the subjective quality within the frame is homogenous. Alternative schemes exploiting the properties of the human visual system to that end can be applied here.

Preferably, control level 3) is disabled in case of coarse quantisation since otherwise no strict control of bit generation is possible.

Advantageously, if the bit allocation in level 1) is successful, level 2) should maintain a mostly constant virtual buffer status, i.e. a constant quantiser step size, throughout a frame.

However, the bit allocation can fail and/or the complexity can be distributed very inhomogeneously within the frame, so that in practice this will never be completely true.

Another reason for sub-optimum performance of the control scheme is the fact that the complexity values computed in step 1) are not constant for a given image, but they depend on the quantisation step size in a way that cannot easily be modelled. This is depicted in FIG. 6, showing the complexity X over quantiser step size Q for I frames of 12 different sequences. When coding natural picture sequences one can observe some degree of oscillation in bit allocation for subsequent P frames, although the scene was completely temporally homogeneous. Advantageously, this behaviour can be avoided if a complexity measure is used that is independent of the applied quantiser step size.

In VBR applications the following additional considerations must be made, beginning with the encoder and decoder buffers.

As mentioned above, physical buffers are advantageous even in the VBR case. The reason for this is the huge amount of bits produced by I frames compared to other frame types. When encoding standard TV pictures (CCIR 601 resolution) at a reasonable quality with CBR, e.g. at 5 Mbit/s, a typical instantaneous data rate for an I frame can be more than 15 Mbit/s, with "instantaneous data rate" defined as (bits generated by a frame)/(one frame period).

As long as the peak data rate of the storage device is below this value, a buffer is still necessary to be able to achieve higher quality with VBR than with CBR coding. The VBV_buffer_size of 1.75 Mbit for Main Profile @ Main Level will limit the peak instantaneous data rate to e.g. a more than sufficient 45 Mbit/s rate assuming an initially empty buffer. Advantageously, the VBR output of the encoder buffer and the VBR input of the decoder buffer can be modelled as leaky buckets. Data always leaks at the peak rate of the channel. It leaks out of the encoder buffer as long as data is present in it, while it leaks into the decoder buffer as long as it is not full.

For control purposes the physical buffer status can be monitored once per frame (field) period only. However, this means that a buffer portion of the size [(peak data rate)/(frame period)] is needed to cope with a possible unequal bit production during the frame period. This further limits the peak instantaneous data rate. Advantageously, buffer control on a unit by unit (macroblock by macroblock) basis can be used to avoid this situation.

A VBR control should reach the following goals:

As postulated at the beginning a VBR encoder control should be more targeted to equalising the quality over the whole duration of a recording on the storage medium. Especially, bits should not be spent unless an additional (visible) gain in quality can be expected. From the rate control point of view, two scenarios can be distinguished.

Scenario 1) Fit a maximum duration of video on a storage medium of given capacity:

A sufficient quality can be selected by the application designer by setting the quantiser step size from control step 2) to an appropriate value. The content adaptive quantisation of step 3) should still be done, since it addresses the subjective quality harmonisation within each frame. In fact, improvements in this area are possible if vision models are used that better reflect the artefact visibility by a human observer.

Rate control is now necessary only to avoid overflow of the encoder buffer. Underflow will not occur in a VBR application, since the variable channel data rate is allowed to be zero temporarily.

Scenario 1a) Guaranteed minimum duration of video:

Using a rate control as described in scenario 2) below, it would furthermore be possible to guarantee a minimum recording duration on the medium. Depending on the complexity of the video, the recording duration can also be higher than this minimum.

Scenario 2) Fit a video of given duration on a medium of given capacity:

Again, it is assumed that there is no a priori analysis of the complexity distribution throughout the video material. As long as there is no complexity measure available that is independent from the quantiser step size and that can be derived from variables that are readily available from a reasonably low cost encoder, control solutions to equalise the video quality throughout its duration have to use some heuristics and will not be optimum.

The basic idea for a VBR control approach is to have a very loose control with varying bit rate at the beginning, while control becomes tighter when the end of the capacity of the storage medium is approached or when the remaining duration of the picture material to be coded is such that a pre-selected minimum bit rate can not be guaranteed throughout this remaining duration.

It should be noted, however, that this approach privileges the beginning of a recording, that can now exhibit constant quality, while a constant rate with possibly lower quality is enforced toward the end.

Advantageously, this disadvantage can be remedied to some extent if the constant bit rate $R_e$ that is used toward the end of the recording is selected to be higher than the average bit rate $R_{avg}$ for the whole recording. That average bit rate can be computed as $$R_{avg} = B/T \tag{8}$$

with B being the total storage medium capacity and T the video material duration.

Advantageously, this bit rate $R_e$ is chosen such that most video content at the end exhibits acceptable quality while the quality for the first part of the recording is still better than in case of CBR coding of the whole recording.

So, from the above, for each kind of recording the unknown variables are the quantiser step size at the start of the encoding and the constant bit rate $R_e$ toward the end. Unfortunately, it is not easily possible to find a suitable quantiser step size to start with, since without knowledge about the complexity of a video it is difficult to estimate its bit production at a given quantiser step size.

Furthermore, it is somewhat messy to build a control scheme that monitors the physical buffer fullness at all times and allows the transition from constant quantiser to constant rate operation. This transition depends on the amount of bits produced until a point in time t as well as on the duration that remains to be encoded. Early production of an unproportionately high amount of bits as well as a short remaining duration are indicators for the need of tight rate control.

Therefore, the following modified rate control scheme is proposed:

It is preferable to keep the bit rate controlled during the whole recording. By having a very loose control (=very big virtual buffers) and by removing the constant bit budget $B_G(g)$ per GOP at the beginning it is possible to allow rather large variations in instantaneous bit rate (i.e. a quasi-constant quantiser step size) so that at least scene changes and difficult scenes of a duration of a couple of seconds will benefit from this loose control.

For this purpose it is necessary to define the behaviour change of the rate control scheme over time.

First, reasonable values for the average bit rate at the beginning and at the end of the recording need to be defined. Taking $R_{avg}$ as the average bit rate for this recording, computed as in equation (8), it is advantageous to have for instance:

$$R_{start}=0.95*R_{avg} \quad (9a)$$

$$R_{end}=1.5*R_{avg}, \quad (9b)$$

considering that 0.95 times the average bit rate would in the worst case lead to a negligible loss if the whole picture sequence has a constant complexity over time, while 1.5 times the average bit rate at the end is sufficient to properly code most worst case picture content if it happens to occur just at the end.

Over the whole time (with a linear transition from $R_{start}$ to $R_{end}$) $R_{avg}$ can be regarded as composed of $$R_{avg}=R_{start}*\tau_1+0.5*(R_{start}+R_{end})\tau_2+R_{end})*\tau_3 \quad (10a)$$

with the time periods $\tau_1$, $\tau_2$, and $\tau_3$ normalised to be $$\tau_1+\tau_2+\tau_3=1 \text{ (total time of storage medium)} \quad (10b)$$

With the above assumptions it is necessary to select one more parameter. Setting $\tau_3$ to 0.01 reflects the fact, that precise control of the overall bit production can be re-established in a very short time. Given e.g. one hour video duration T this corresponds to $\tau_3*T=36$ seconds. $\tau_3$ can be regarded as an overall bit number adaptation period. Solving the equations (9a) to (10b) yields $$E_1=0.79 \text{ and } E_2=0.20.$$

With these figures loose control will occur during about 79% of the recording time while the transition phase takes about 20% of the total time. Other transition characteristics can be implemented that increase the percentage of time with loose control even more.

The time variant parameters of the rate control can now be described using $$\alpha = \begin{cases} 0, & \tau < \tau_1 \\ (\tau - \tau_1)/(\tau_2 - \tau_1), & \tau_1 \leq \tau \leq \tau_2 \\ 1, & \tau > \tau_2 \end{cases} \quad (11)$$

Other transition characteristics for $\alpha$ can be implemented between time instants $E_1$ and $\tau_2$.

The bit rate used for step 1) of the rate control now is $$R(\tau)=(1-\alpha)*R_{start}+\alpha*R_{end} \quad (12)$$

The virtual buffer sizes $V_{co}$, c=i,p,b, are advantageously modified to be $$V_c(\tau)=((1-\alpha)*V_{huge}+\alpha)*V_{co} \quad (13)$$

For example, an increase in size of $V_{huge}=100$ can be used. These huge virtual buffers corresponding to a very slow reaction are intentional for short time intervals of complex picture material. However, it is not desirable that a non-complex part of the video following a long complex part could now be coded with a very coarse quantiser step size. It is therefore necessary to use the above mentioned idea of a quicker reaction parameter in case the bit production (=the virtual buffer status) decreases more than predicted, i.e. falls below the target. This parameter, $Vd_c$, might also be time variant according to $$Vd_c(\tau)=((1-\alpha)*Vd_{huge}+\alpha)*Vd_{co}, \quad (14)$$

but as initial guess $Vd_{huge}=1$ is proposed, since during the whole duration a fast reaction is desirable in this case. Advantageously, the re-filling of the bit budget $B_F(n)$ is now carried out not only once per GOP. Refill per frame n:

$$B_F(n)=B_F(n-1)+(1-\alpha)*R(\tau)/(\text{frame rate})$$

Refill per GOP g:

$$B_F(n=0)=B_G(g)=\alpha*R(\tau)*(\text{frames per GOP})/(\text{frame rate})+B_G(g-1)$$

Apart from the emptying of the encoder buffer and, hence, the VBV as a leaky bucket, as described before, these can be the only changes that need to be made to the CBR rate control as described in the first part of the specification.

In principle, the inventive method of encoding digital video data is suited for storage on memory or recording means having a given data storage capacity and allowing a variable instantaneous storage bit rate, whereby for a first part of said storage capacity the data is encoded using a slightly less than average bit rate and a significantly more loose than average bit rate control;

for a second part of said storage capacity the data is encoded using a higher than average bit rate and a tight bit rate control.

In principle, the inventive method is suited for decoding digital video data stored on memory or recording means having a given data storage capacity and allowing a variable instantaneous reading bit rate into decoding buffer means, whereby during a first part of said storage capacity the data is decoded using a slightly less than average decoder buffer means input bit rate and significantly higher than average allowable buffer filling level variations;

during a second part of said storage capacity the data is decoded using a higher than average decoder buffer means input bit rate and less than average allowable buffer filling level variations.

Advantageous additional embodiments of the inventive methods are resulting from the respective dependent claims.

In principle the inventive apparatus is suited for encoding digital video data for storage on memory or recording means having a given data storage capacity and allowing a variable instantaneous storage bit rate, using an encoding loop including discrete cosine transform means, quantiser means, inverse quantiser means, inverse discrete cosine transform means, picture store means, and entropy encoding means delivering the encoded output signal and being connected to the output of said quantiser means, wherein said quantiser means, said inverse quantiser means, and said entropy encoding means are controlled in the following way:

for a first part of said storage capacity the data is encoded using a slightly less than average bit rate and a significantly more loose than average bit rate control;

for a second part of said storage capacity the data is encoded using a higher than average bit rate and a tight bit rate control.

In principle the inventive apparatus is suited for decoding digital video data which are stored on memory or recording means having a given data storage capacity and allowing a variable instantaneous reading bit rate into decoding buffer means, using a chain of entropy decoding means, inverse quantiser means, inverse discrete cosine transform means, and adding means delivering the decoded output signal which is also fed to picture store means the output signal of which is provided to a second input of said adding means, wherein said decoding buffer means are controlled in the following way:

during a first part of said storage capacity the data is decoded using a slightly less than average decoder buffer means input bit rate and significantly higher than average allowable buffer filling level variations;

during a second part of said storage capacity the data is decoded using a higher than average decoder buffer means input bit rate and less than average allowable buffer filling level variations.

Advantageous additional embodiments of the inventive apparatuses are resulting from the respective dependent claims.

In principle, the inventive digital video signal is suited for storage on memory or recording means having a given data storage capacity and allowing a variable instantaneous storage bit rate, whereby during a first part of said storage capacity the signal is encoded using a slightly less than average bit rate and a significantly more loose than average bit rate control;

during a second part of said storage capacity the signal is encoded using a higher than average bit rate and a tight bit rate control.

Preferably, the inventive digital video signal is an MPEG2 or MPEG1 or H261 encoded video signal.

The inventive storage medium, in particular an optical disc, contains or has recorded on it an inventive digital video signal.

BRIEF DESCRIPTION OF THE DRAWINGS

Preferred embodiments of the invention are described with reference to the accompanying drawings, which show in.

DESCRIPTION OF THE PREFERRED EMBODIMENTS

In a CBR and in a VBR application the MPEG2 encoder MENC produces variable bit rate data VBRD which is intermediately stored in the encoder buffer ENCB. The filling level of this buffer can be used to control the coding process in MENC. At receiver side variable bit rate data VBRD which is intermediately stored in the decoder buffer DECB are fed to an MPEG2 decoder MDEC. The reading of that data from DECB is controlled by MDEC.

Figure 1:
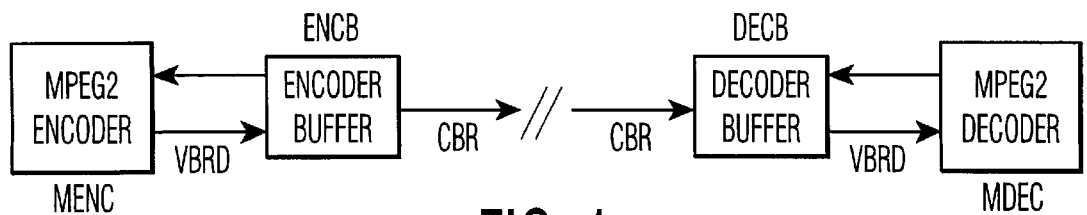
FIG. 1 constant bit rate system.
Figure 2:
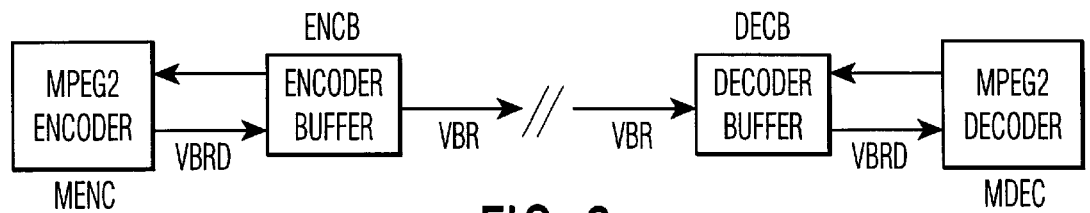
FIG. 2 variable bit rate system.

In FIG. 1 the encoder buffer ENCB delivers a constant bit rate data stream CBR to the decoder buffer DECB. In FIG. 2, however, the encoder buffer ENCB delivers a variable bit rate data stream VBR to the decoder buffer DECB.

Figure 3:
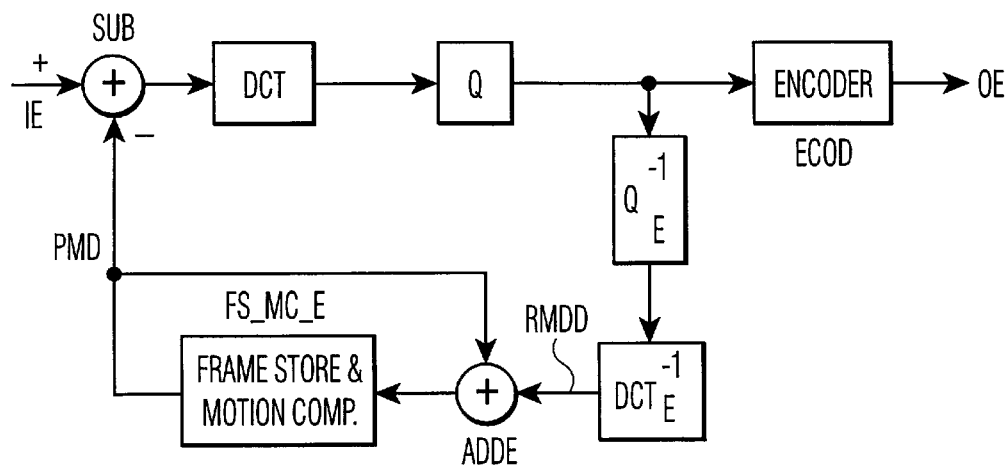
FIG. 3 basic block diagram of MPEG encoder.

In FIG. 3 the encoder video data input signal IE includes macroblock data to be encoded. In case of intraframe data a subtractor SUB simply passes the data via discrete cosine transform computing means DCT and quantising means Q to entropy encoding means ECOD which may include ENCB and which deliver the encoder video data output signal OE.

In case of interframe data subtractor SUB subtracts predicted macroblock data PMD from the input signal and passes the difference data via discrete cosine transform computing means DCT and quantising means Q to entropy encoding means ECOD. The output signal of Q is also fed to inverse quantising means $Q_E^{-1}$ the output signal of which passes through inverse discrete cosine transform computing means $DCT_E^{-1}$ to adder ADDE in the form of reconstructed macroblock difference data RMDD. The output signal of ADDE is intermediately stored in frame store and motion compensation means FS_MC_E which also perform motion compensation on reconstructed macroblock data and which deliver such predicted macroblock data PMD to SUB and to the other input of adder ADDE.

Quantising means Q, inverse quantising means $Q_E^{-1}$, and ECOD are controlled by the filling level of encoder buffer ENCB in the inventive way described above. It is also possible that FS_MC_E does not perform motion compensation.

The variable bit rate output to the storage medium can be done using the maximum possible bit rate while there is data available from the encoder buffer, and can be suspended else.

Figure 4:
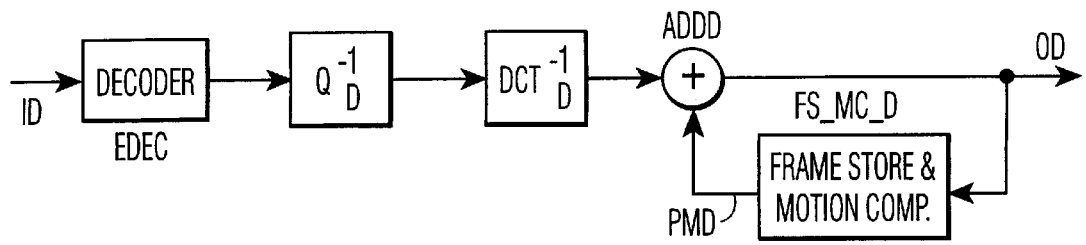
FIG. 4 basic block diagram of MPEG decoder.
Figure 5:
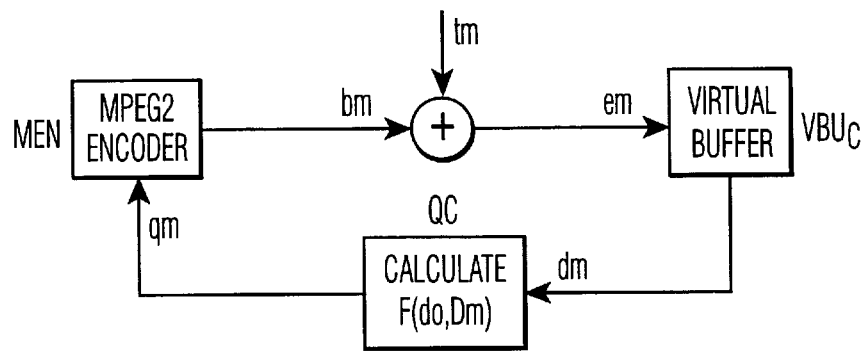
FIG. 5 structure of a control loop.
Figure 6:
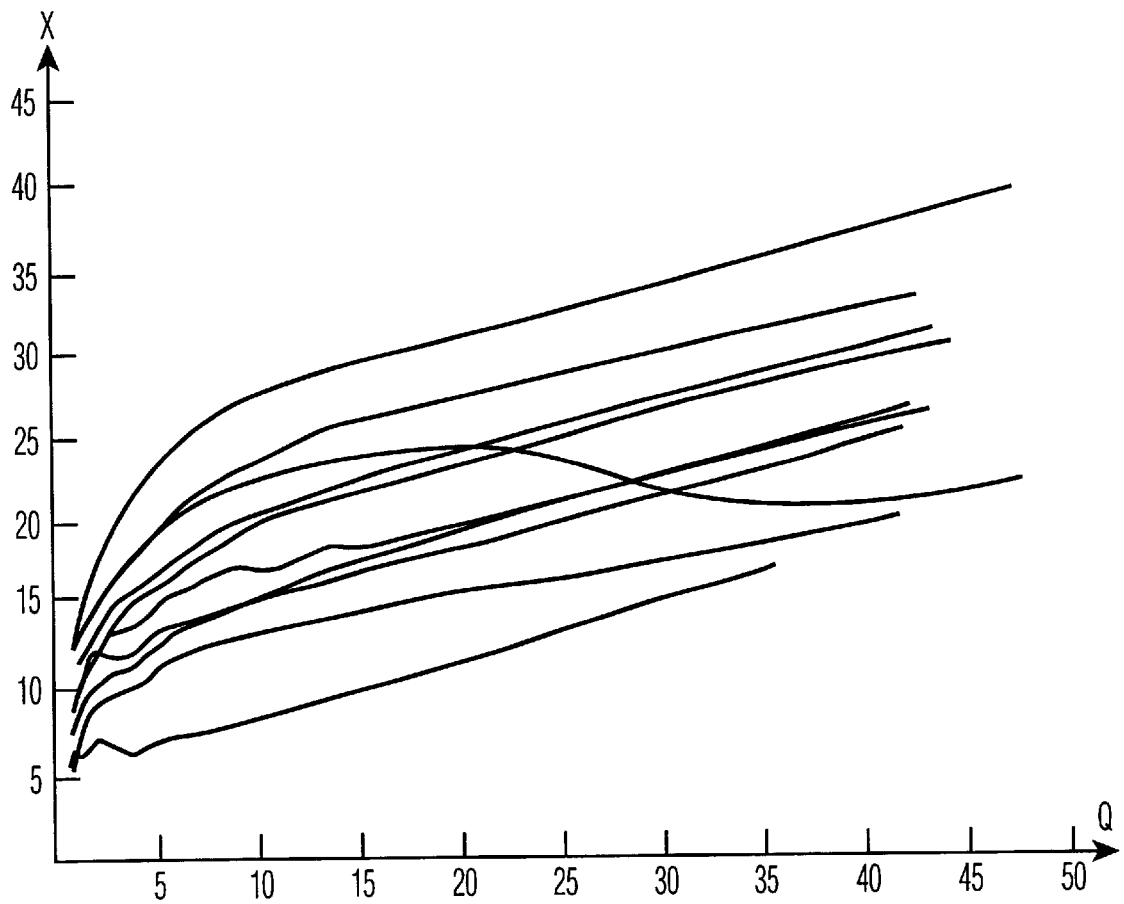
FIG. 6 example functions for complexity over quantiser step size.

In FIG. 4 the decoder video data input signal ID passes through entropy decoding means EDEC which may include DECB, inverse quantising means $Q_D^{-1}$, and inverse discrete cosine transform computing means $DCT_D^{-1}$ to an adder ADDD which delivers the decoder video data output signal OD. The output signal of ADDD is fed to frame store and motion compensation means FS_MC_D which also perform motion compensation on reconstructed macroblock data and which in case of interframe macroblock data deliver such predicted macroblock data PMD to the other input of adder ADDE. In case of intraframe macroblock data the adder ADDD simply passes the output signal of $DCT_D^{-1}$.

Inverse quantising means $Q_D^{-1}$ and EDEC are controlled according to the kind of control for $Q_E^{-1}$ and ECOD. Normally, in motion compensation means FS_MC_D the same motion vector information is used as in motion compensation means FS_MC_E. It is also possible that FS_MC_D does not perform motion compensation.

In order to handle situations of high bit rate demand, e.g. in case of scene changes and complex scene content, the decoder buffer DECB is filled from the storage medium with preferably the maximum possible bit rate. This can be done generally in case DECB is not full whereby no data from the storage medium is stored into DECB if DECB is full. As an alternative, DECB can be filled with a bit rate which corresponds to the respective bit rate when storing data on the memory or recording means. In either case the reading bit rate out of DECB corresponds to that when encoding, i.e. the allowed and sometimes really occurring average buffer filling level variations are greater in the first part ($\approx 80\%$) of the total capacity and are less in the last part ($\approx 20\%$) of the total capacity. "Average allowable buffer filling level variations" means the variation over a length of some GOPs.

The invention can be used in any means like DVD, other optical or magneto-optical or ferro-optical discs, electronic or optical RAM or ROM, and magnetic tape systems which use a given capacity for storing video data.

The invention is not limited to MPEG2 encoders and decoders, but can also be used with MPEG1 (ISO/IEC 11172-2), H261 (ISO/IEC), and other coding and decoding methods in e.g. standard TV, HDTV, and videophone applications.

What is claimed is:

1. A method for encoding a sequence of digital video data to be stored, occupying a predetermined storage capacity on a storage medium, the storage medium allowing a variable instantaneous storage bitrate, wherein the overall average bitrate of the digital video data is said predetermined storage capacity divided by the duration of said sequence, comprising the steps:

encoding said digital video data stored in a first part of said predetermined storage capacity using an average bitrate which is less than said overall average bitrate and using a loose instantaneous bitrate control;

encoding said digital video data in a remaining part of said predetermined storage capacity using an average bitrate which is higher than said overall average bitrate and using a tight instantaneous bitrate control.

2. The method according to claim 1, wherein:

in said first part of said predetermined storage capacity said average data rate is about 95% of said overall average bit-rate and in said second part of said predetermined storage capacity said average bitrate is about 150% of said overall average data rate.

3. The method according to claim 1, wherein:

said first part is about 80% and said second part is about 20% of said predetermined storage capacity.

4. The method according to claim 1, wherein:

between said first part and said second part of said predetermined storage capacity there is a further part in which said bitrate control changes smoothly.

5. A method for decoding a sequence of digital video data occupying a predetermined storage capacity on a storage medium, the storage medium allowing a variable instantaneous reading bitrate into decoding buffer means, wherein the overall average bitrate of digital video data is said predetermined storage capacity divided by the duration of said sequence, comprising the steps:

decoding said digital video data stored in a first part of said predetermined storage capacity using an average bitrate which is less than said overall average bitrate and corresponding to a loose instantaneous bit-rate control;

decoding said digital video data in a remaining part of said predetermined storage capacity using an average bitrate which is higher than said overall average bitrate and corresponding to a tight instantaneous bitrate control.

6. The method according to claim 2, wherein:

in said first part of said predetermined storage capacity said average data rate is about 95% of said overall average bit-rate and in said second part of said predetermined storage capacity said average bitrate is about 150% of said overall average data rate.

7. The method according to claim 2, wherein:

said first part is about 80% and said second share is about 20% of said predetermined storage capacity.

8. The method according to claim 2, wherein:

between said first part and said second part of said predetermined storage capacity there is a further part in which said bitrate control changes smoothly.

9. Apparatus for encoding a sequence of digital video data to be stored, occupying a predetermined storage capacity on a storage medium, the storage medium allowing a variable instantaneous storage bitrate, wherein the overall average bitrate of the digital video data is said predetermined storage capacity divided by the duration of said sequence, said apparatus comprising:

an encoding loop including discrete cosine transform means:

quantiser means:

inverse quantiser means:

inverse discrete cosine transform means:

picture store means; and entropy encoding means delivering the encoded output signal and being connected to the output of said quantiser means, wherein said quantiser means, said inverse quantiser means, and said entropy encoding means encode said digital video data within a first share of said predetermined storage capacity using an average bitrate which is less than said overall average bitrate and using a loose instantaneous bitrate control and encode said digital video data within the remaining share of said predetermined storage capacity using an average bitrate which is higher than said overall average bitrate and using a tight instantaneous bitrate control.

10. Apparatus for decoding a sequence of digital video data occupying a predetermined storage capacity on a storage medium, the storage medium allowing a variable instantaneous reading bitrate into decoding buffer means wherein the overall average bitrate of digital video data is said predetermined storage capacity divided by the duration of said sequence, said apparatus comprising:

a chain of entropy decoding means;

inverse quantiser means;

inverse discrete cosine transform means; and adding means delivering the decoded output signal which is also fed to picture store means the output signal of which is provided to a second input of said adding means, wherein said decoding buffer means and said inverse quantiser means decode said digital video data within a first share of said predetermined storage capacity using an average bitrate which is less than said overall average bitrate and corresponding to a loose instantaneous bit-rate control and decode said digital video data within the remaining share of said predetermined storage capacity using an average bitrate which is higher than said overall average bitrate and corresponding to a tight instantaneous bitrate control.

11. An optical disk for storing encoded sequential digital video data wherein said encoded digital video data occupies a predetermined storage capacity on said optical disk, said optical disk allowing a variable instantaneous reading bitrate into decoding buffer means, said digital video data including decoding control information, wherein the overall average bitrate of the digital video data is said predetermined storage capacity divided by the duration of a sequence, and wherein said digital video data stored in a first part of said predetermined storage capacity is decoded using said control information and an average bitrate which is less than said overall average bitrate and corresponding to a loose instantaneous bit-rate control, and said digital video data in a remaining part of said predetermined storage capacity is decoded using said control information and an average bitrate which is higher than said overall average bitrate and corresponding to a tight instantaneous bitrate control.

* * * * *